United States Patent
Nord

(10) Patent No.: US 12,284,712 B2
(45) Date of Patent: Apr. 22, 2025

(54) METHODS FOR ENHANCING SERVICE CONTINUITY BETWEEN A WIRELESS DEVICE AND A SECOND NETWORK, RELATED CORE NETWORK NODES, AND RELATED WIRELESS DEVICES

(71) Applicant: Sony Group Corporation, Tokyo (JP)

(72) Inventor: Lars Nord, Lund (SE)

(73) Assignee: Sony Group Corporation, Tokyo (JP)

( * ) Notice: Subject to any disclaimer, the term of this patent is extended or adjusted under 35 U.S.C. 154(b) by 314 days.

(21) Appl. No.: 17/788,166

(22) PCT Filed: Dec. 17, 2020

(86) PCT No.: PCT/EP2020/086884
§ 371 (c)(1),
(2) Date: Jun. 22, 2022

(87) PCT Pub. No.: WO2021/140004
PCT Pub. Date: Jul. 15, 2021

(65) Prior Publication Data
US 2023/0028197 A1    Jan. 26, 2023

(30) Foreign Application Priority Data
Jan. 7, 2020    (SE) .................................... 2050005-4

(51) Int. Cl.
*H04W 4/00*    (2018.01)
*H04W 76/12*   (2018.01)
(Continued)

(52) U.S. Cl.
CPC ........... *H04W 76/25* (2018.02); *H04W 76/12* (2018.02); *H04W 76/22* (2018.02)

(58) Field of Classification Search
CPC ...... H04W 76/25; H04W 76/12; H04W 76/22
See application file for complete search history.

(56) References Cited

U.S. PATENT DOCUMENTS 8,204,502 B2 *   6/2012  Khetawat ................ H04W 8/04
                                                         455/445
11,832,096 B2 *  11/2023 Liao ........................ H04W 80/10
(Continued)

OTHER PUBLICATIONS

International Search Report from and Written Opinion from corresponding International Application No. PCT/EP2020/086884, Apr. 9, 2021, 15 pages.
(Continued)

*Primary Examiner* — Abdelnabi O Musa
(74) *Attorney, Agent, or Firm* — Tucker Ellis LLP

(57) ABSTRACT

Disclosed is a method performed by a first core network node, for enhancing service continuity between a wireless device and a second network via a first network, wherein the first core network node is part of the first network. The method comprises receiving, from the wireless device and/or from a second core network node of the first network, control signalling indicating that the wireless device requires that a tunnel between the wireless device and the second network and via a gateway of the first network is maintained. The method comprises controlling a radio access network node and/or the gateway based on the control signalling and a capability of the first core network node of the first network to maintain the tunnel.

20 Claims, 7 Drawing Sheets

(51) Int. Cl.
*H04W 76/22* (2018.01)
*H04W 76/25* (2018.01)

(56) References Cited

U.S. PATENT DOCUMENTS

| | | | |
|---|---|---|---|
| 2011/0216743 A1 | 9/2011 | Bachmann et al. | |
| 2019/0289459 A1* | 9/2019 | Shan | H04W 76/25 |
| 2019/0306754 A1* | 10/2019 | Shan | H04W 8/06 |
| 2021/0120524 A1* | 4/2021 | Palle | H04W 68/005 |
| 2022/0007180 A1* | 1/2022 | Liao | H04L 67/14 |
| 2022/0030488 A1* | 1/2022 | Han | H04W 36/00698 |
| 2022/0124542 A1* | 4/2022 | Li | H04W 88/085 |
| 2022/0150740 A1* | 5/2022 | Yao | H04W 76/10 |
| 2022/0159616 A1* | 5/2022 | Stojanovski | H04W 68/02 |

OTHER PUBLICATIONS

Office Action and Search Report from corresponding Swedish Application No. 2050005-4, Dec. 4, 2020, 8 pages.

Qualcomm Incorporated et al., "Clarifications and evaluation of solution 20 (PLMN/NPN service access)", 3rd Generation Partnership Project (3GPP) SA WG2 Meeting #129bis, Nov. 26-30, 2018, S2-1811656, 8 pages.

3rd Generation Partnership Project (3GPP), "Technical Specification Group Services and System Aspects; Study on enhancement of 5G System (5GS) for vertical and Local Area Network (LAN) services (release 16)", 3GPP TR 23.734 V16.2.0, Jun. 2019, 117 pages.

3rd Generation Partnership Project (3GPP), "Technical Specification Group Services and System Aspects; System architecture for the 5G System (5GS); Stage 2 (Release 16)", TS 23.501, V16.3.0, Dec. 2019, 417 pages.

3rd Generation Partnership Project (3GPP), "Technical Specification Group Services and System Aspects; Procedures for the 5G System (5GS); Stage 2 (Release 16)," 3GPP TS 23.502, V16.3.0, Dec. 2019, 558 pages.

3rd Generation Partnership Project (3GPP), "Technical Specification Group Services and Systems Aspects; Study on enhanced support of non-public networks (Release 17)", 3GPP TR 23.700-07, V1.2.0, Nov. 2020, 247 pages.

3rd Generation Partnership Project (3GPP), "Technical Specification Group Services and System Aspects; 3GPP System Architecture Evolution; Report on Technical Options and Conclusions (Release 8)", TR 23.882, V8.0.0, Sep. 2008, 234 pages.

Sony, "Update to KI#2", 3rd Generation Partnership Project (3GPP) WG2 Meeting #136, Nov. 18-22, 2019, S2-1911146, 2 pages.

Qualcomm Incorporated, "Qos support for access to PLMN services via SNPN and vice versa", 3rd Generation Partnership Project (3GPP) SA WG2 Meeting #132, Apr. 8-12, 2019, S2-1903275, 4 pages.

Intel, "On Qos differentiation for access to SNPN (PLMN) services via PLMN (SNPN)", 3rd Generation Partnership Project (3GPP) SA WG2 Meeting #S2-132, Apr. 8-12, 2019, S2-1903834, 2 pages.

* cited by examiner

200

S202 Sending an indication to the first network which indicates an intention/request for maintaining a tunnel towards a second network

Fig. 3

METHODS FOR ENHANCING SERVICE CONTINUITY BETWEEN A WIRELESS DEVICE AND A SECOND NETWORK, RELATED CORE NETWORK NODES, AND RELATED WIRELESS DEVICES

The present disclosure pertains to the field of wireless communications. The present disclosure relates to methods for enhancing service continuity between a wireless device and a second network, related core network nodes, and related wireless devices.

BACKGROUND

In 3rd Generation Partnership Project, 3GPP, systems, e.g. in release 16, simultaneous data service from both a first network (e.g. 3GPP network, e.g. a non-public network, NPN), and a second network (e.g. a public land mobile network, PLMN) is supported.

A connection to the other network may be provided by an interworking function entity (e.g. a non-3GPP interworking function, N3IWF) in a similar fashion as for Non-3GPP Access. For example, when the first network is a NPN, then the second (or other) network may be a PLMN. Conversely, in other examples, when the first network is a PLMN, then the second (or other) network may be a NPN.

The wireless device (e.g. a user equipment, UE) and the interworking function entity set up a secure tunnel over a reference point (e.g. Nwu).

It may be desirable to utilize the non-3GPP access network functionality in the above scenario.

However, this may be problematic when the wireless device using 3GPP access is in RRC Idle mode or RRC Inactive mode (where RRC stands for Radio Resource Control).

SUMMARY

When the wireless device enters RRC idle mode and CM-Idle mode (where CM stands for Connection Management), the connection over the secure tunnel may be lost, since the gateway may reuse the IP address and/or port number for other use when the wireless device is no longer active.

Another shortcoming may also be that the second network utilizing the non-3GPP access network functionality cannot page the wireless device in the first network over 3GPP radio access network, RAN. When the wireless device's state in the second network, e.g. a PLMN, enters CM-Idle, the N1 is lost and TS 23.501 v16.3.0 and TS 23.502 v16.3.0 does not support how the second network (e.g. Access Management Function, AMF in the PLMN) can trigger paging of the wireless device camping on a RAN in the first network (e.g. 3GPP network, e.g. NPN).

Accordingly, there is a need for core network nodes, wireless devices and methods for enhancing service continuity between a wireless device and a second network, which mitigate, alleviate or address the existing shortcomings and provide service continuity to the wireless devices while letting the wireless device benefit from one or more specify power saving modes.

Disclosed is a method performed by a first core network node, for enhancing service continuity between a wireless device and a second network via a first network, wherein the first core network node is part of the first network. The method comprises receiving, from the wireless device and/or from a second core network node of the first network, control signalling indicating that the wireless device requires that a tunnel between the wireless device and the second network via a gateway of the first network is maintained. The method comprises controlling a radio access network node and/or the gateway based on the control signalling and a capability of the first core network node of the first network to maintain the tunnel.

Further, a core network node is provided, the core network node comprising a memory circuitry, a processor circuitry, and a wireless interface, wherein the core network node is configured to perform any of the methods disclosed herein.

It is an advantage of the present disclosure that the second network's reachability of the wireless device and the service continuity to the wireless device is enhanced while allowing the wireless device to benefit from one or more specify power saving modes. The disclosed method and disclosed first core network node enable a wireless device to receive data services from the first network (e.g. NPN), and paging as well as data services from the second network (e.g. PLMN) simultaneously.

Further, disclosed is a method, performed by a wireless device, for service continuity between a first network and a second network, the method comprises sending an indication to the first network which indicates an intention/request for setting a tunnel towards a second network.

Disclosed is a wireless device comprising a memory circuitry, a processor circuitry, and a wireless interface, wherein the wireless device is configured to perform any of the methods disclosed herein.

Advantageously, the wireless device disclosed herein benefits from one or more specify power saving modes and is capable of resuming the data session faster, and thereby can benefit from an enhanced service continuity to the second network. Furthermore, the disclosed method requires a minimum set of network nodes to be involved, in that e.g. the core network node NEF (Network Exposure Function) does not need to be further enhanced to support paging services from the second network or a third party service.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which:

FIG. 3 is a flow-chart illustrating an exemplary method, performed in a network node of a wireless communication system, for a low-latency resumption of a data communication with a wireless device according to this disclosure.

DETAILED DESCRIPTION

Figure 1A:
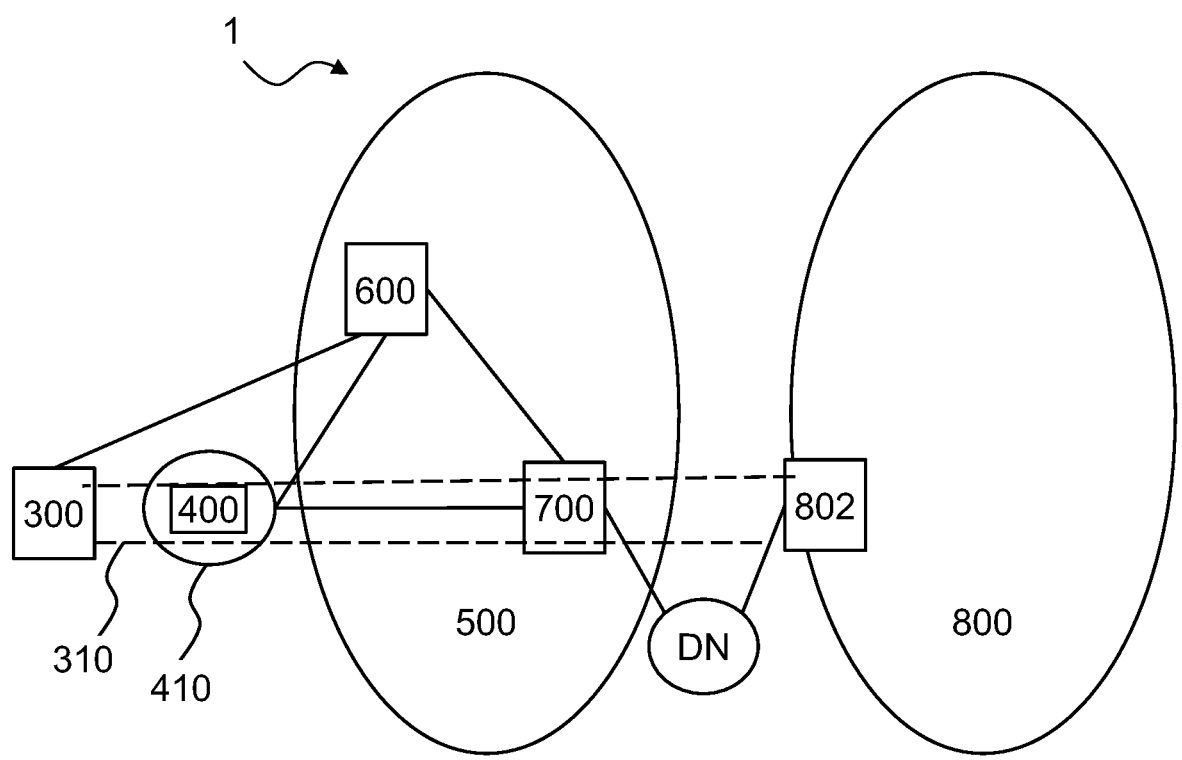
FIGS. 1A-1B is a diagram illustrating exemplary communication systems comprising an exemplary first core network node and an exemplary wireless device according to this disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

Figure 1B:
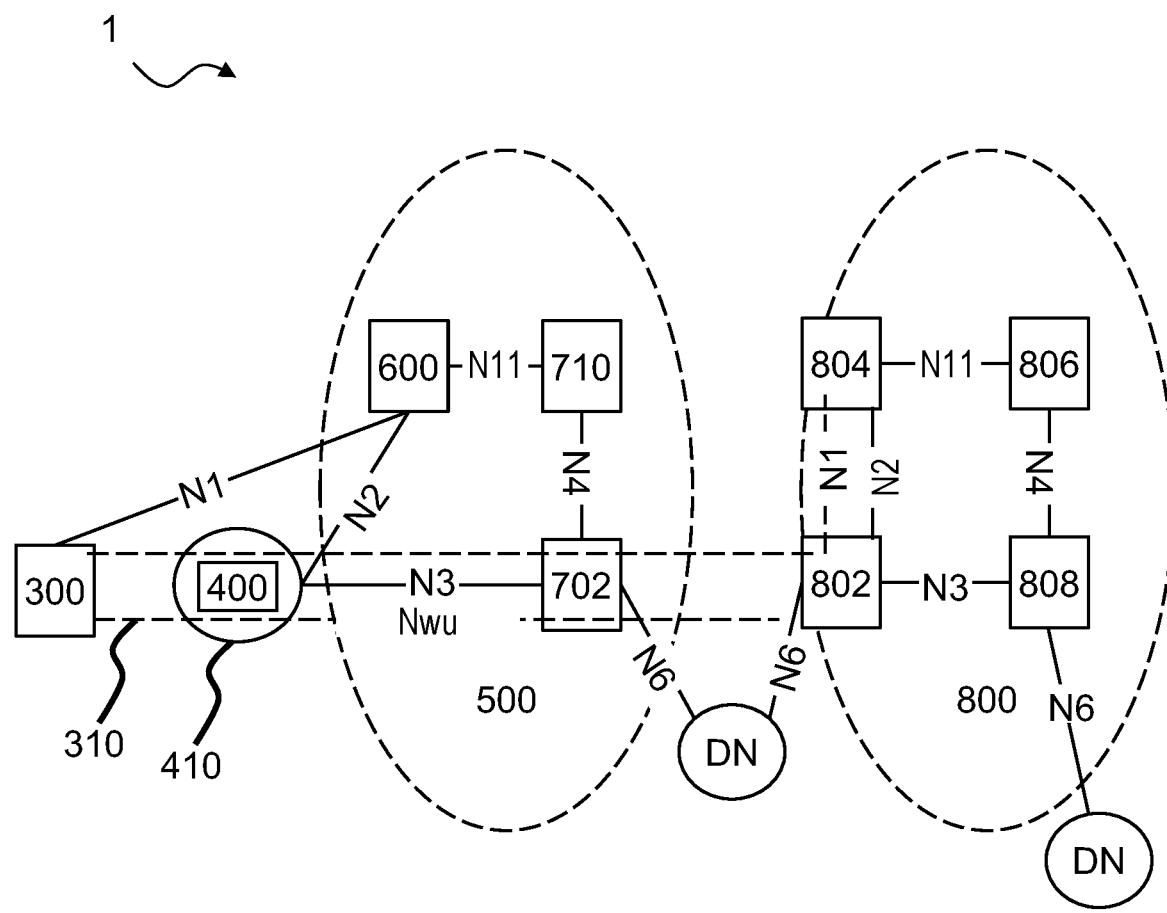

FIGS. 1A-B are diagrams illustrating exemplary communication systems 1.

In FIG. 1A, the communication system 1 comprises a radio access network, RAN, 410, a first network 500 and a second network 800.

As discussed in detail herein, the present disclosure relates to a communication system 1 comprising a cellular system, e.g. a 3GPP wireless communication system. The wireless communication system 1 comprises a wireless device 300 and/or a RAN node 400 and/or one or more core network nodes 600, 700.

A RAN node disclosed herein refers to a radio access network node operating in the radio access network, such as a base station, an evolved Node B, eNB, gNB.

The wireless device 300 may be configured to communicate with the RAN node 400 via a wireless link (or radio access link).

The wireless communication system 1 described herein may comprise one or more wireless device 300, and/or one or more RAN nodes 400, such as one or more of: a base station, an eNB, a gNB and/or an access point.

A wireless device may refer to a mobile device and/or a user equipment, UE. In the present disclosure, the wireless device 300 is configured to communicate simultaneously via the first network and the second network.

The first network 500 is for example a 3GPP network, e.g. a non-public network, NPN (such as Public Network Integrated NPN (PNI-NPN), and/or a standalone non-public networks (SNPN)). The second network 800 is for example a 3GPP network, e.g. a public PLMN. In one or more example embodiments, the first network 500 is operated by a first operator and the second network 800 is operated by a second operator which is different from the first operator. The second network 800 comprises a core network node 802, which may serve as an interworking function, e.g. N3IWF.

It may be envisaged that the first network 500 and the second network 800 have overlapping radio coverage areas.

The radio access network 410 comprises an exemplary RAN node 400 configured to communicate via a wireless link with an exemplary wireless device 300 according to this disclosure. The RAN 410 is a 3GPP RAN.

The first network 500 may be seen as a first core network. The first network 500 comprises an exemplary first core network node 600 and optionally an exemplary second core network node 700. In some embodiments, the first network 500 comprises an exemplary first core network node 600, an exemplary second core network node 710 and a gateway 702. The first network 500 is a 3GPP network. In one or more example embodiments, the first core network node 600 comprises an Access Management Function, AMF. The first core network node 600 may be configured to perform one or more of: access control, mobility management and NAS message security. In one or more example embodiments, the second core network node 700 comprises a Session/Service Management Function, SMF (e.g. 710 of FIG. 1B) and/or User Plane Function, UPF (e.g. 702 of FIG. 1B). For example, the second core network node 700 is configured to manage session, e.g. Protocol Data Unit, PDU, session, e.g. PDU session context. For example, the UPF 702 is configured by the SMF 710 to provide user plane functionality e.g. route the PDUs between network gateway and RAN 400, to enforce e.g. quality of service rules. As illustrated in FIG. 1B, in one or more example embodiments, the first network 500 comprises for example an AMF 600 configured to communicate with 400 over N2 interface and optionally N1 interface with the wireless device 300 and/or with an SMF 710 over N11 interface. As illustrated in FIG. 1B, the first network 500 comprises for example a UPF 702 configured to communicate with a data network DN over N6 interface, the DN providing a connection to the N3IWF 802.

The second network 800 comprises a core network node 802, which may serve as an interworking function, e.g. N3IWF.

As illustrated in FIG. 1B, the second network 800 comprises, for example, an AMF 804 configured to communicate with 802 over N2 interface and optionally with the device 300 over N1 interface and/or with an SMF 806 over N11 interface. As illustrated in FIG. 1B, the second network 800 comprises, for example, a UPF 808 configured to communicate with a data network DN over N6 interface, and optionally with 802 over N3 interface, and optionally with 806 over N4 interface.

A connection to the second network 800 may be provided by an interworking function 802 (e.g. a non-3GPP, interworking function, N3IWF) in a similar fashion as for Non-3GPP Access.

The wireless device 300 (e.g. a user equipment, UE) and the interworking function 802 set up a secure tunnel 310 over a reference point (e.g. Nwu).

However, the wireless device 300 using 3GPP access can enter RRC Idle mode or RRC Inactive mode (where RRC stands for Radio Resource Control). When the wireless device 300 enters CM-Idle mode (where CM stands for Connection Management), the connection over the secure tunnel 310 may be lost.

Another shortcoming may also be that the second network 800 as a 3GPP access network cannot page the wireless device 300 in the 3GPP radio access network 410. When the wireless device's state in the second network 800 enters CM-Idle, the N1 is lost and TS 23.501 v16.3.0 and TS 23.502 v16.3.0 does not support how the second network 800 (e.g. AMF in the PLMN) can trigger paging of the wireless device 300 camping on a RAN 410 in the first network 500 (e.g. 3GPP network, e.g. NPN).

Never letting the wireless device 300 enter power save mode is a poor approach. Maintaining the wireless device 300 in RRC Connected is also a poor approach.

The present disclosure allows the wireless device to enter RRC Inactive while maintaining the secure tunnel between the wireless device and N3IWF. This is achieved by maintaining the PDU session active, since the power save mode RRC Inactive keeps the UE in CM-Connected state meaning that the PDU sessions including the network tunnels (e.g. RAN to UPF, UPF to UPF) are maintained. In this way it is still possible to let the UE enter a power saving mode even if it is limited to RRC Inactive mode.

A secure tunnel between the wireless device 300 and N3IWF 802 is sufficiently robust to support interruption on any link between the end point for a certain time period. However, when there is no or limited traffic, then keep-alive messages have to be sent to keep the tunnel for not time out. For example, a maximum period between the keep-alive messages may be set to 8 hours.

In the industry, default lifetime configurations of the tunnel are configured to allow the wireless device 300 to enter RRC Inactive for a significant time of a day and still logically keep the tunnel between the wireless device 300 and N3WIF.

One way to maintain PDU session/user plane tunnels is to let the NPN keep the wireless device in a core network active state e.g. CM-Connected/RRC Inactive. When the wireless device 300 is in RRC Inactive, PDU session/user plane tunnels/N1 etc. are to be maintained looking from the second network (e.g. PLMN) towards the wireless device 300. For example, when there is a service that would like to communicate with the wireless device 300, then either the DL data or an N1 notification is triggered to establish a new PDU session/data flow is sent directly to the RAN. Once the packet reaches the RAN node 400, the RAN node 400 will start to page the wireless device 300. The wireless device 300 can after being paged resume all radio bearers and receive the DL data/NAS message.

However, sometimes it desirable to let the wireless device enter an CM-Idle/RRC-idle mode (e.g. in case the UE has high mobility). It may be envisaged that the UE even enter Idle mode in the NPN and still keep the secure tunnels to the second network (PLMN). Some aspects of this disclosure are based on the insight that this may be possible if the AMF in the PLMN is not informed about the wireless device entering CM idle mode in the NPN. This may be achieved by letting the UE send a release request to the NPN or the RAN/AMF/SMF in the NPN and requesting the NPN not to inform any node in the PLMN of the state change. In this way the PLMN will keep the secure tunnel as long as the keep alive messages are sent to the tunnel endpoint (N3IWF)

When the wireless device 300 is in CM Idle in the first network 500, there is usually no guarantee that the NAT in the first network's UPF gateway 702 would keep the port number that the UE/PDU session used. If the port number is changed than the IPsec tunnel between the UE and the N3IWF would be broken and not work any longer. The present disclosure address this shortcoming e.g. by maintaining the tunnel between the wireless device and the second network via a gateway of the first network, e.g. by enabling a static configuration of the IP address and/or port number (e.g. by the SMF configuring the static IP address and/or port number) even during longer inactivity periods, and/or by setting up an additional tunnel between the UPF 702 and N3IWF 802, and then use this tunnel to guarantee that the wireless device 300 address is static so that the IPsec tunnel between the wireless device 300 and N3IWF 802 is maintained inside the outer tunnel (e.g. outer IPsec tunnel with the endpoints UPF 702 and N3IWF 802). This may overcome NAT issues when using UDP and TCP.

A static IP address and port number may be achieved by using a dynamic IP address and/or port configuration with a time to live TTL longer than the IPsec tunnel keep alive period.

For example, the present disclosure allows the wireless device 300 to enter CM-Idle mode in the first network (e.g. NPN) by using a tunnel, e.g. a long-lived tunnel, between the first network and the second network (e.g. by using static IP address and port number in the first network node (e.g. UPF and/or gateway)).

In other words, the present disclosure allows the wireless device 300 to be released to RRC Inactive when the wireless device 300 have a connection to a second network, e.g. via a N3IWF.

In other words, the present disclosure allows the wireless device 300 to use either RRC Inactive or RRC Idle, e.g. by using static IP address and port number in the second core network node (e.g. UPF and/or gateway)). In other words, the present disclosure allows the wireless device 300 to use either RRC Inactive or RRC Idle, e.g. by using a (long-lived) tunnel between the gateway 702 of the first network and the N3IWF 802.

Since it is up to RAN to decide whether the wireless device 300 is to enter RRC Inactive or RRC Idle, the presently disclosed techniques are advantageous. Referring to the techniques indicating to the RAN whether there is any limitation to which of the power save modes to be used.

Figure 2:
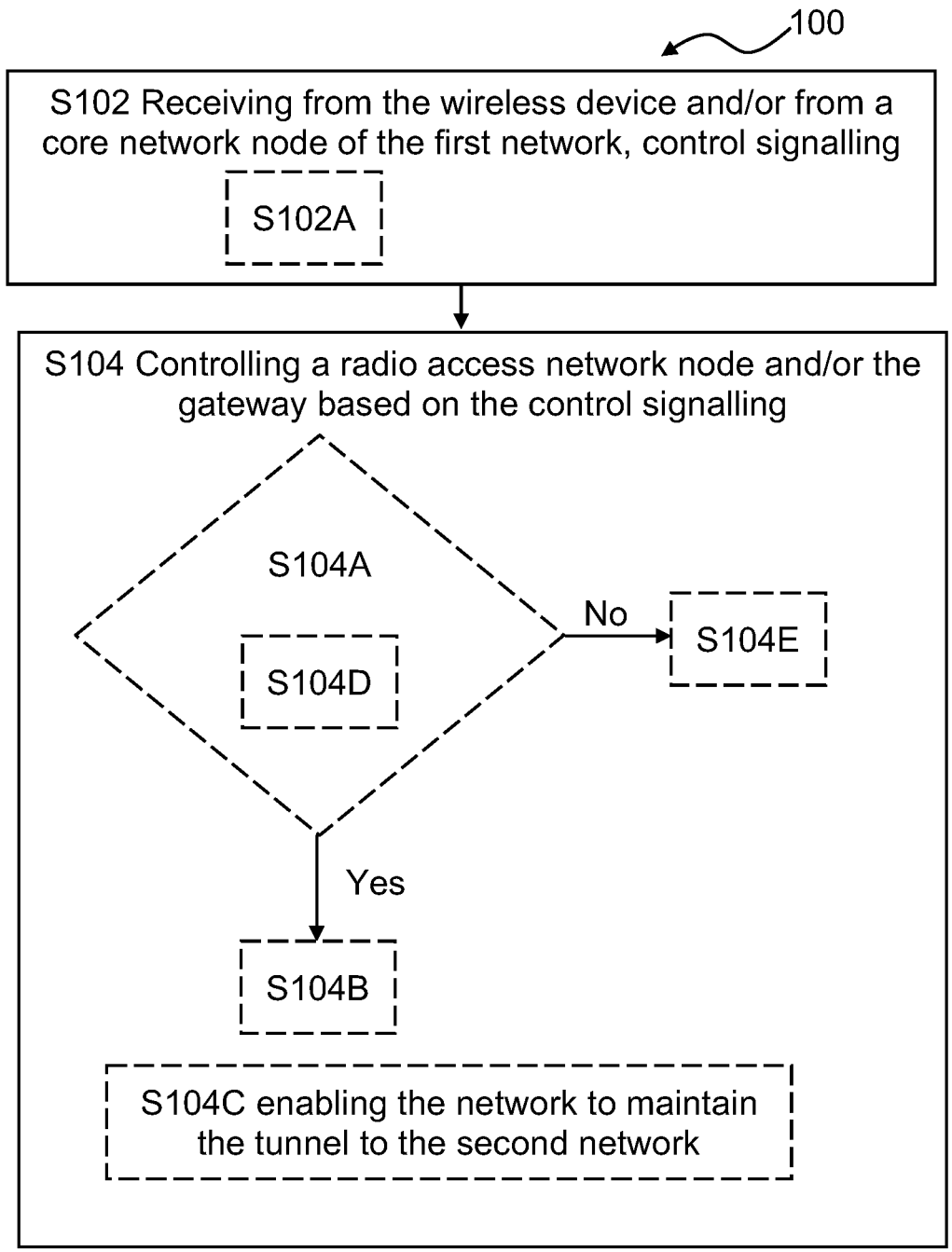
FIG. 2 is a flow-chart illustrating an exemplary method performed by a first core network node, for enhancing service continuity between a wireless device and a second network via a first network according to this disclosure.

FIG. 2 shows a flow diagram of an exemplary method 100 performed by a first core network node, for enhancing service continuity between a wireless device and a second network via a first network. The first core network node is part of the first network according to the disclosure.

In one or more example methods, the first network is a non-public network (NPN (such as Public Network Integrated NPN (PNI-NPN), and/or a standalone non-public networks (SNPN)).

In one or more example methods, the second network is a public network (e.g. a PLMN network). For example, the first core network node of the first network may be an AMF as disclosed herein, e.g. the first core network node 600 of FIGS. 1A-1B. Service continuity may be seen as the ability of the wireless device to communicate simultaneously via the first network and the second network.

Optionally, the wireless device is in CM-Connected state or CM-Idle state in the first network (e.g. in the first core network) and CM-Connected state in the second network (e.g. in the second core network). For example, the wireless device connects to the second network, e.g. via a N3IWF.

For example, the core network node (AMF) in the second network (e.g. PLMN) is not informed about the wireless device entering CM idle mode.

For example, the wireless device stays in CM-Connected in the second network.

The method 100 comprises receiving S102, from the wireless device and/or from a second core network node of the first network, control signaling indicating that the wireless device requires that a tunnel between the wireless device and the second network via a gateway of the first network is maintained. The tunnel between the wireless device and the second network via a gateway of the first network is required e.g. by the wireless device when connecting to services in e.g. the PLMN using the non-3GPP access features (e.g. the N3IWF). For example, the non-3GPP access feature requires that the UE to setup a secure tunnel to the N3IWF to get access to the services in the PLMN. The second core network node (e.g. illustrated as 710 in FIG. 1B) may comprise an SMF. In one or more example embodiments, the gateway and the second core network node correspond to the UPF, providing the information to the first core network node 600 via the SMF.

In one or more example methods, the control signalling indicating that that the wireless device requires that a tunnel between the wireless device and the second network via a gateway of the first network to be maintained is received S102A in a session request from the wireless device to the first network. For example, the session request is a PDU session establishment request or a service request to the AMF of the first network. For example, the tunnel may be seen as a long-lived tunnel.

The tunnel between the wireless device and the second network via a gateway of the first network may correspond a tunnel having a lifetime which is longer than the lifetime based on a traffic pattern indicative of an amount of traffic and/or periodicity of traffic (e.g. lifetime of the tunnel is set to suitable long time to allow the UE to enter sleep mode (RRC Inactive and/RRC Idle). For example, the wireless device needs to perform periodic updates to the second network e.g. every 10-15 min. A tunnel may be based on IPsec tunnel life cycle, e.g. 8 h or longer, e.g. 12 h. For example, for the IPsec tunnel, the wireless device or the N3IWF needs to interchange an IPsec signaling (e.g. keep alive) for the tunnel not to time out/terminate. In other words, as long as there is traffic within the tunnel, then the IP address and port configuration cannot be re-used for other wireless devices.

In one or more example methods, the tunnel is a secure tunnel (e.g. an IPSec tunnel).

In one or more example methods, the tunnel is an secure tunnel between the wireless device and an interworking function configured to enable interoperation between the first network and the second network. For example, the tunnel may be over Nwu the reference point between the wireless device and the N3IWF for establishing secure tunnel(s) between the wireless device and the N3IWF so that control-plane and user-plane exchanged between the wireless device and the second 5G core network is transferred securely over the untrusted data network (DN).

In one or more example methods, the tunnel between the wireless device and the N3IWF is within a further secure tunnel between the gateway of the first network and the N3IWF 802, e.g. an outer tunnel.

The method 100 comprises controlling S104 a radio access network node and/or the gateway based on the control signaling and a capability of the first core network node of the first network to maintain the tunnel. For example, the capability to maintain the tunnel may be in the form of a parameter configured in the first network node indicating that the first network node is capable of maintaining the tunnel, e.g. maintaining the wireless device external address.

For example, the capability of the first core network node of the first network to maintain the tunnel may comprise an internal configuration logic in the first network. For example, the first network and/or first core network node is capable of one or more of the following: 1) Maintaining long-lived IP address and port configuration independently of CM state of the wireless device, 2) only able to maintain the long-lived IP address and port configuration when the user plane is still activate (i.e. the UE is not allowed to enter CM-idle in the first network, i.e. the UE has to be in CM-Connected). The capability may be stored in the first core network node, e.g. in a static network configuration and may not be signalled during operation.

In one or more example methods, controlling S104 comprises determining S104A, based on the control signaling and a capability of a first core network node of the first network to maintain the tunnel, whether the wireless device is limited to use one or more specific power saving modes of a set of power saving modes. In other words, the wireless device may only be allowed to use the one or more specific power saving modes. Stated differently, the wireless device may not be allowed to use power saving modes other than the one or more specific power saving modes. For example, the one or more specific power saving modes comprise a state where the tunnel can be maintained. For example, the one or more specific power saving modes comprise RRC Inactive mode, in this example the device is not allowed to enter RRC-Idle mode. In other examples, the one or more specific power saving modes comprise RRC Inactive or RRC Idle mode.

In one or more example methods, the power saving modes may comprise RAN power saving modes, such as power saving modes associated with the wireless device in the RAN.

In one or more example methods, the power saving modes may comprise of a corresponding CM states, such as power saving states associated with the wireless device in the core network.

Advantageously, the disclosed method allows to enter into RRC Inactive or even in to RRC Idle/CM-Idle in the first network.

In one or more example methods, controlling S104 comprises transmitting S104B, to the radio access network, RAN, control signalling indicating that the wireless device is limited to use the one or more specific power saving modes. For example, the one or more specific power saving modes comprise RRC Inactive mode. In one or more example methods, the control signalling indicating that the wireless device is limited to use the one or more specific power saving modes comprises an assistance information message. For example, the assistance information message may comprise RRC Inactive Assistance information, e.g. information element, IE of the assistance information message. For example, a new IE can be added to the RRC Inactive Assistance Information indicating to the RAN that the wireless device shall only be released to RRC Inactive state i.e. the device shall not be released to RRC idle state. For example, the new IE may indicate that only RRC-Inactive shall be used in some embodiments. For example, a value in the IE may allow both RRC Inactive and RRC Idle in some embodiments. For example, if no assistance information is sent, then only RRC-idle is used. In one or more example methods, controlling S104 comprises transmitting S104B, to the radio access network, RAN, control signalling indicating that the wireless device is limited to use the one or more specific power saving modes upon determining that the wireless device is limited to use one or more specific power saving modes of the set of power saving modes (e.g. when it is determined that the wireless device is limited to use one or more specific power saving modes of the set of power saving modes). For example, when the first core network node (e.g. AMF) has determined that the second core network node (e.g. SMF/UPF) is not capable to maintain the tunnel ((e.g. the IP address and port number) if the PDU session is inactivated), the first core network node determines that the wireless device is limited to use one or more specific power saving modes of a set of power saving modes, then the first core network node proceeds to transmitting S104B control signalling. For example, in such a scenario, the first core network node (e.g. AMF) needs to limit the power save function to RRC Inactive or RRC dormant.

In one or more example methods, controlling S104 comprises forgoing S104E transmitting, to the radio access network, RAN, control signalling indicating that the wireless device is limited to use the one or more specific power saving modes upon determining that the wireless device is not limited to use one or more specific power saving modes of a set of power saving modes (e.g. when it is not determined that the wireless device is limited to use one or more specific power saving modes of the set of power saving modes). For example, when it is not determined that the wireless device is limited to use one or more specific power saving modes of the set of power saving modes, the first core network node does not transmit to the radio access network, RAN, control signalling indicating that the wireless device is limited to use the one or more specific power saving modes.

In one or more example methods, controlling S104 comprises determining which one or more specific power saving modes is to be used at the wireless device upon determining that the wireless device is limited to use one or more specific power saving modes of the set of power saving modes (e.g. when it is determined that the wireless device is limited to use one or more specific power saving modes of the set of power saving modes).

In one or more example methods, controlling S104 comprises enabling S104C the network (e.g. the second core network node and/or the gateway) to maintain the tunnel to the second network. For example, the SMF sets up the UPF and maintains the tunnel to the second network. For example, setting up and maintaining S104C the tunnel to the second network comprises logically maintaining the IPsec tunnel (e.g. tunnel 310 of FIG. 1A-1B) between the UE and N3WIF. For example, the first network (e.g. the second core network node) may use specific configuration in the gateway (e.g. UPF) to maintain the session, e.g. a long-lived session.

In one or more example methods, the control signalling indicating that the tunnel is required by the wireless device triggers, at the second core network node, a maintenance of a static IP address and/or port configuration of the gateway of the first network or a dynamic IP address and/or port configuration with a time to live TTL longer than the IPsec tunnel keep alive period. In other words, the second network is not aware of any state changes of the wireless device in the RAN. Stated differently, the second network is unaware as long as the IPsec tunnel is maintained.

In one or more example methods, the method 100 comprises forwarding, to the second core network node, the control signaling indicating that the tunnel between the wireless device and the second network via the gateway of the first network is required. For example, the second core network node of the first network performs maintenance of a static IP address and/or a static port configuration of the gateway of the first network or of a dynamic IP address and/or port configuration with a time to live TTL longer than the IPsec tunnel keep alive period.

In one or more example methods, determining S104A comprises receiving S104D from the second core network node or from the gateway a notification that the address of an end point of the tunnel is a known address of the second network (e.g. of the N3IWF for the second network). For example, the second core network node or the gateway detects that the PDU session is used for the IPSec tunnel based on that e.g. the IP address used belongs to a known N3IWF for second network. Based on the detection in the second core network node or gateway, the second core network node or gateway informs (signals to) the first core network node with a notification in S104D that the address of an end point of the tunnel is a known address of the second network and thereby the tunnel can be maintained, and eventually determines based on the notification that the wireless device is limited to use one or more specific power saving modes of the set of power saving modes.

FIG. 3 shows a flow diagram of a corresponding exemplary method 200 performed by a wireless device, for service continuity between a wireless device and a second network via a first network. The wireless device is configured to communicate via a RAN to the first network, e.g. to a first core network node part of the first network according to the disclosure.

The method 200 comprises sending S202 an indication to the first network (e.g. the first core network node) which indicates an intention and/or a request for maintaining a tunnel towards a second network, as explained above (in relation to S102 of FIG. 2).

In one or more example methods, the indication is sent in a session request (e.g. network access stratum, NAS, message, for example a PDU session establishment request, and/or Service Request).

In one or more example methods, the method 200 comprises receiving, from a radio access network, RAN, node, control signalling indicating that the wireless device is limited to use the one or more specific power saving modes. For example, the one or more specific power saving modes comprise RRC Inactive mode. For example, the control signalling indicating that the wireless device is limited to use the one or more specific power saving modes comprises a RRC release message from the RAN node.

In one or more example methods, the method 200 comprises receiving, from the radio access network, RAN, node, a paging request.

Data on existing PDU session or N1 messages sent across N3IWF to the first network can trigger either the RAN node or AMF to page the wireless device. Whether the RAN node or the AMF node triggers paging depends on the mode the UE is in. The UE performs all necessary periodic registrations/updates to both networks and any keepalive activities to maintain the IPsec tunnel over Nwu.

In one or more example methods, the method 200 comprises receiving, from the second network via the radio access network, RAN, node, user data.

Figure 4:
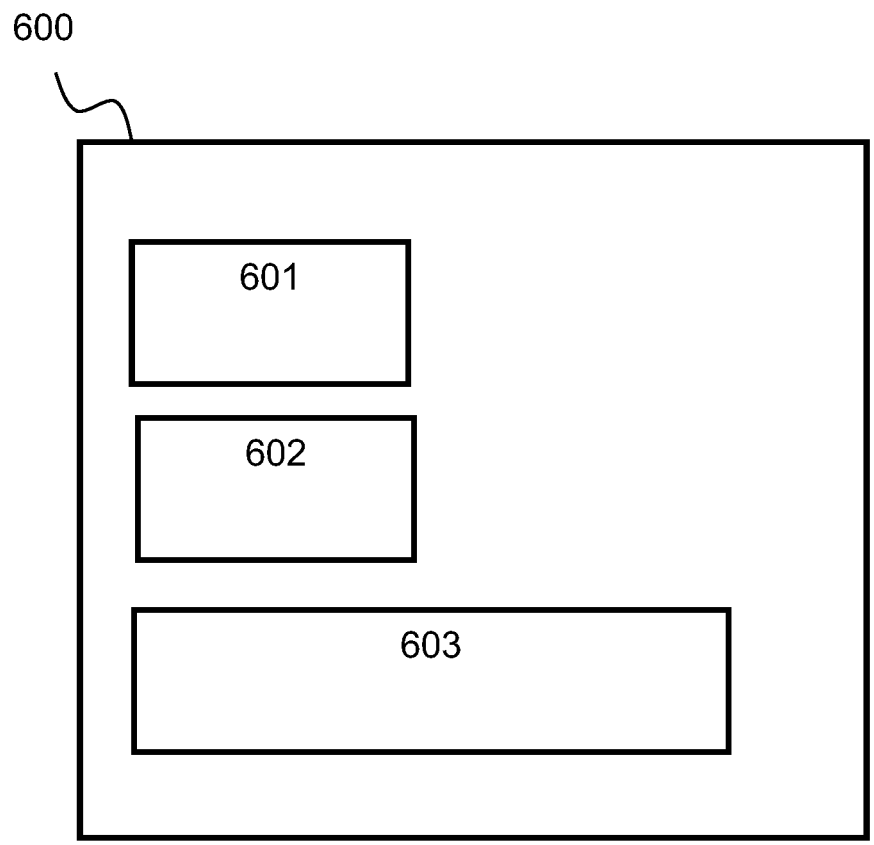
FIG. 4 is a block diagram illustrating an exemplary first core network node according to this disclosure.

FIG. 4 shows a block diagram of an exemplary first core network node 600 according to the disclosure. The first core network node 600 comprises a memory circuitry 601, a processor circuitry 602, and an interface 603. The first core network node 600 may be configured to perform any of the methods disclosed in FIG. 2. In other words, the first core network node 600 may be configured for supporting service continuity.

The first core network node 600 is configured to communicate with a wireless device, such as the wireless device disclosed herein, using a wireless communication system.

The interface 603 is configured for wired communications and/or wireless communications via a wireless communication system, such as a 3GPP system.

The first core network node 600 is configured to receive, via the interface 603, from the wireless device and/or from a second core network node of the first network, control signalling indicating that the wireless device requires that a tunnel between the wireless device and the second network via a gateway of the first network is maintained.

The first core network node 600 is configured to control, e.g. via the processor circuitry 602, a radio access network node and/or the gateway based on the control signalling and a capability of the first core network node of the first network to maintain the tunnel.

The processor circuitry 602 is optionally configured to perform any of the operations disclosed in FIG. 2 (such as any one or more of S102A, S104A, S104B, S104D, S104E). The operations of the first core network node 600 may be embodied in the form of executable logic routines (e.g., lines of code, software programs, etc.) that are stored on a non-transitory computer readable medium (e.g., the memory circuitry 601) and are executed by the processor circuitry 602).

Furthermore, the operations of the first core network node 600 may be considered a method that the first core network node 600 is configured to carry out. Also, while the described functions and operations may be implemented in software, such functionality may as well be carried out via dedicated hardware or firmware, or some combination of hardware, firmware and/or software.

The memory circuitry 601 may be one or more of a buffer, a flash memory, a hard drive, a removable media, a volatile memory, a non-volatile memory, a random access memory (RAM), or other suitable device. In a typical arrangement, the memory circuitry 601 may include a non-volatile memory for long term data storage and a volatile memory that functions as system memory for the processor circuitry 602. The memory circuitry 601 may exchange data with the processor circuitry 602 over a data bus. Control lines and an address bus between the memory circuitry 601 and the processor circuitry 602 also may be present (not shown in FIG. 4). The memory circuitry 601 is considered a non-transitory computer readable medium.

The memory circuitry 601 may be configured to store the capability of the first core network node to maintain the tunnel in a part of the memory.

Figure 5:
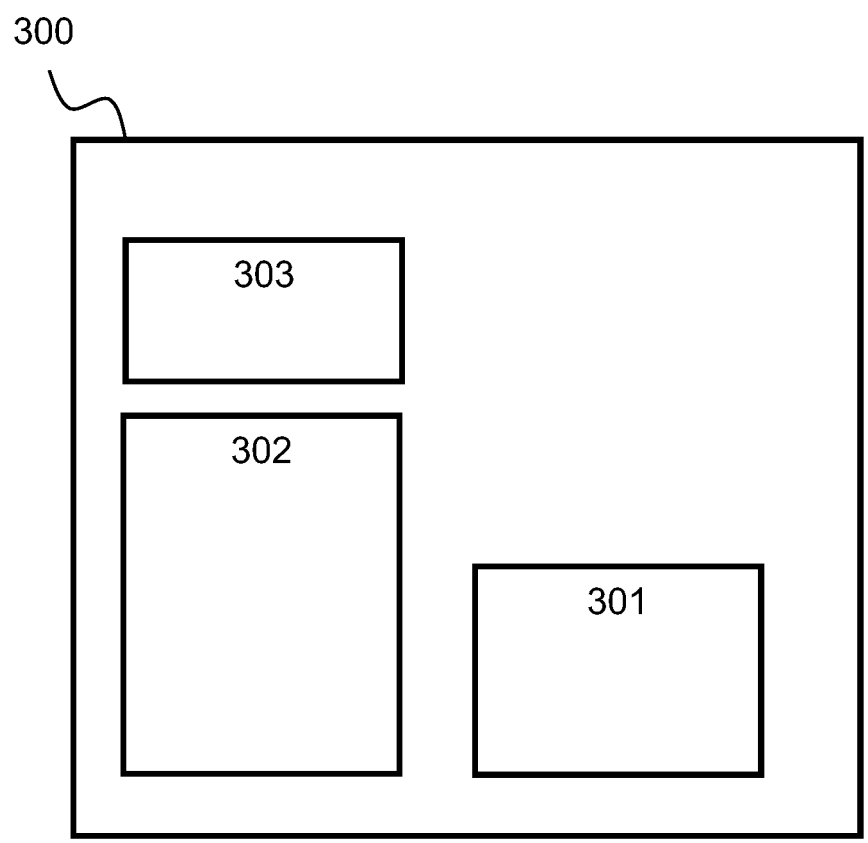
FIG. 5 is a block diagram illustrating an exemplary wireless device according to this disclosure.

FIG. 5 shows a block diagram of an exemplary wireless device 300 according to the disclosure. The wireless device 300 comprises a memory module 301, a processor module 302, and a wireless interface 303. The wireless device 300 may be configured to perform any of the methods disclosed in FIG. 3.

The wireless interface 303 is configured to communicate with a radio network node, such as the radio network node disclosed herein, using a wireless communication system. The wireless interface 303 is configured for wireless communications via a wireless communication system, such as a 3GPP system, such as a 3GPP system including a first core network disclosed herein.

The wireless device 300 is configured to perform any of the methods disclosed herein.

The wireless device 300 is configured to communicate simultaneously with the first network and the second network.

The wireless interface 303 is configured to send an indication to the first network (e.g. the first core network node) which indicates an intention and/or a request for setting a tunnel towards a second network.

In one or more example wireless devices, the indication is sent in a session request (e.g. network access stratum, NAS, message, for example a PDU session establishment request, and/or Service Request).

In one or more example wireless devices, the wireless device 300 is configured to receive, via the wireless interface 303, from a radio access network, RAN, node, control signalling indicating that the wireless device is released to a specific power save state. The power save state selected may be limited to use the one or more specific power saving modes. For example, the one or more specific power saving modes comprise RRC Inactive mode. In one or more example wireless devices, the wireless device 300 is configured to receive, via the wireless interface 303, from the radio access network, RAN, node, a paging request.

In one or more example wireless devices, the wireless device 300 is configured to receive, via the wireless interface 303, from the second network via the radio access network, RAN, node, user data.

The processor module 302 is optionally configured to perform any of the operations disclosed in FIG. 2 (S202). The operations of the wireless device 300 may be embodied in the form of executable logic routines (e.g., lines of code, software programs, etc.) that are stored on a non-transitory computer readable medium (e.g., the memory module 301) and are executed by the processor module 302).

Furthermore, the operations of the wireless device 300 may be considered a method that the wireless device is configured to carry out. Also, while the described functions and operations may be implemented in software, such functionality may as well be carried out via dedicated hardware or firmware, or some combination of hardware, firmware and/or software.

The memory module 301 may be one or more of a buffer, a flash memory, a hard drive, a removable media, a volatile memory, a non-volatile memory, a random access memory (RAM), or other suitable device. In a typical arrangement, the memory module 301 may include a non-volatile memory for long term data storage and a volatile memory that functions as system memory for the processor module 302. The memory module 301 may exchange data with the processor module 302 over a data bus. Control lines and an address bus between the memory module 301 and the processor module 302 also may be present (not shown in FIG. 5). The memory module 301 is considered a non-transitory computer readable medium.

Figure 6:
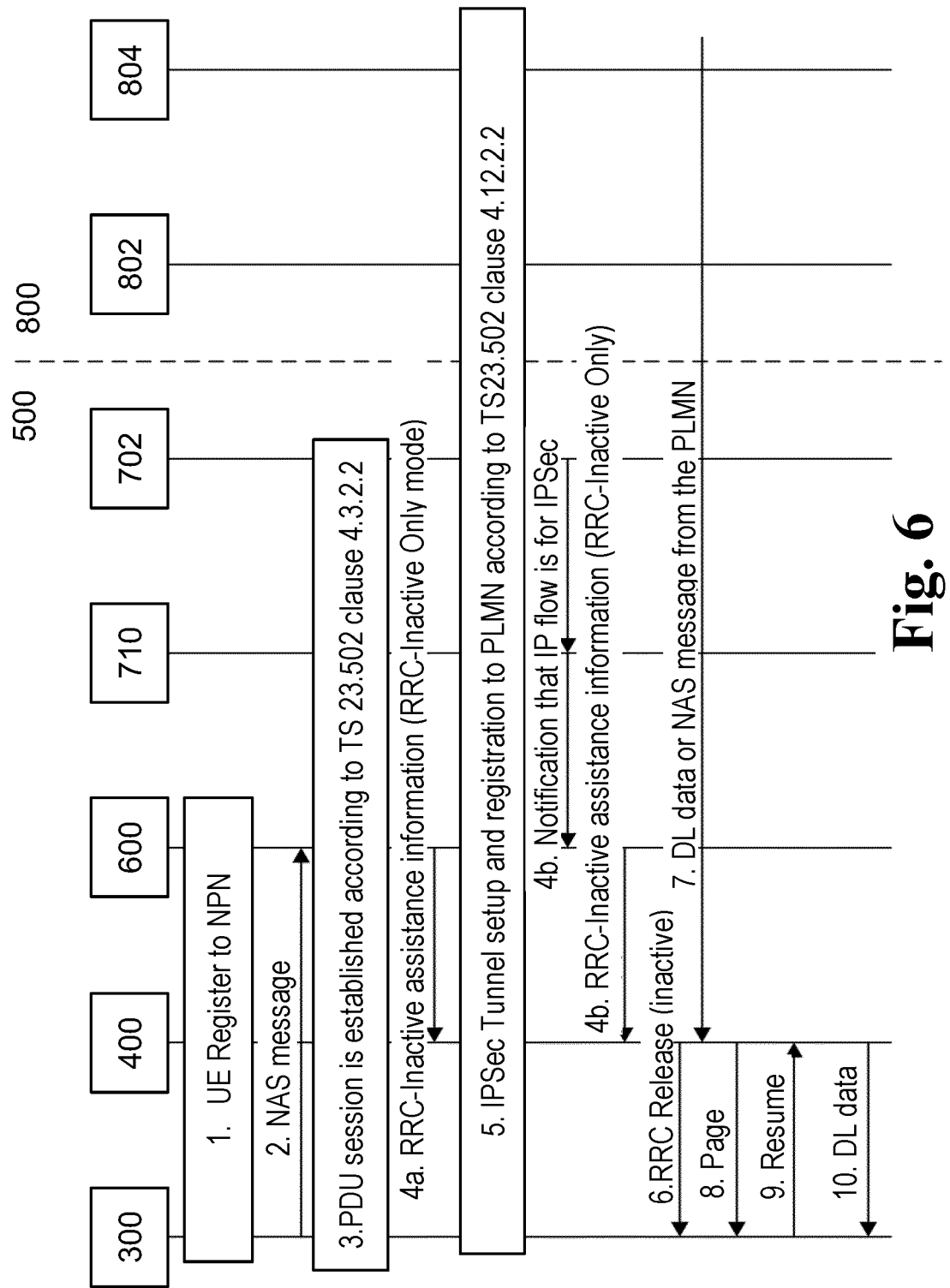
FIG. 6 is a signalling diagram between the various entities disclosed herein.

FIG. 6 is a signalling diagram between the various entities disclosed herein.

The wireless device 300 registers to the first network, e.g. an NPN.

The wireless device 300 requests to setup a PDU session, including that the PDU session is to be used for connecting to a N3IWF. The PDU session may be setup according to TS 23.502 v16.3.0 clause 4.3.2.2.1 step 2-14. Optionally the above indication is provided in the part of the NAS message that also the AMF 600 reads.

The first core network node 600 sends control signalling 4a or 4b indicating that the wireless device is limited to use a specific power saving mode, e.g. an assistance information message. For example the assistance information message includes data in the RRC Inactive Assistance Information that this wireless device 300 shall be released to RRC Inactive. The first core network node 600 sends based on the UE based indication in the PDU session request 2.

The first core network node 600 determines if the wireless device is to be limited to a specific power saving mode based on SMF/UPF detecting that the target address for the IPSec tunnel is an a known N3IWF for PLMN services.

The wireless device 300 setups a IPSec Tunnel and registers to the PLMN, the second network, according to TS 23.502 v16.3.0 clause 4.12.2.2.

The RAN node 400 releases the wireless device 300 to RRC Inactive mode. The RAN node shall always release the UE to RRC Inactive based on the information included in the RRC Inactive Assistance Information in steps 4a and 4b.

In step 7, based on DL data/N1 message from the PLMN to the wireless device 300, the PLMN trigger an PDU session modification according to TS 23.502 v16.3.0 clause 4.12.6. The figure above shows the that the first packet towards the UE will trigger the RAN node to page the wireless device 300

In step 8, the RAN (e.g. RAN node 400) pages the wireless device 300.

In step 9, the wireless device 300 resumes the RRC Connection and the wireless device 300 and N3IWF 802/PLMN AMF 600 complete the remaining steps as described in step 7.

In step 10, DL data/N1 message is sent to the wireless device 300.

Embodiments of methods and products (core network nodes and wireless devices) according to the disclosure are set out in the following items:

Item 1. A method, performed by a first core network node, for enhancing service continuity between a wireless device and a second network via a first network, wherein the first core network node is part of the first network, the method comprising:
receiving (S102), from the wireless device and/or from a second core network node of the first network, control signalling indicating that the wireless device requires that a tunnel between the wireless device and the second network via a gateway of the first network is maintained, and
controlling (S104) a radio access network node and/or the gateway based on the control signalling and a capability of the first core network node to maintain the tunnel.

Item 2. The method according to item 1, wherein controlling (S104) comprises determining (S104A), based on the control signalling and the capability of a first core network node to maintain the tunnel whether the wireless device is limited to use one or more specific power saving modes of a set of power saving modes.

Item 3. The method according to any of the previous items, wherein controlling (S104) comprises transmitting (S104B), to the radio access network, RAN, control signalling indicating that the wireless device is limited to use the one or more specific power saving modes.

Item 4. The method according to any of the previous items, wherein the wireless device is in Connection Management state, CM-Connected state or CM-Idle state in the first network and CM-Connected state in the second network.

Item 5. The method according to any of the previous items, wherein controlling (S104) comprises enabling (S104C) the network to maintain the tunnel to the second network.

Item 6. The method according to any of the previous items, wherein the control signalling indicating that the tunnel is required by the wireless device triggers, at the second core network node, a maintenance of a static IP address and/or port configuration of the gateway of the first network.

Item 7. The method according to any of the previous items, wherein the control signalling indicating that the wireless device requires that the tunnel between the wireless device and the second network via the gateway of the first network is maintained is received in a session request from the wireless device to the first network.

Item 8. The method according to any of the previous items, wherein the control signalling indicating that the wireless device is limited to use the one or more specific power saving modes comprises an assistance information message.

Item 9. The method according to any of the previous items, wherein the specific power saving mode comprises a state where the tunnel can be maintained.

Item 10. The method according to any of the previous items, wherein the specific power saving mode comprises RRC Inactive or RRC Idle, or both RRC Inactive and RRC Idle.

Item 11. The method according to any of the previous items, wherein the tunnel is a secure tunnel.

Item 12. The method according to any of the previous items, wherein the tunnel is an secure tunnel between the wireless device and an interworking function configured to enable interoperation between the first network and the second network.

Item 13. The method according to any of the previous items, wherein determining (S104A) comprises receiving (S104D) from the second core network node or from the gateway, a notification that the address of an end point of the tunnel is a known address of the second network.

Item 14. The method according to any of the previous items, wherein the first network is a non-public network and the second network is a public network.

Item 15. A method, performed by a wireless device, for service continuity between a first network and a second network, the method comprising:
sending (S202) an indication to the first network which indicates a request for maintaining tunnel towards a second network.

Item 16. The method according to item 15, wherein the indication is sent in NAS message.

Item 17. A core network node comprising a memory circuitry, a processor circuitry, and an interface, wherein the core network node is configured to perform any of the methods according to any of items 1-14.

Item 18. A wireless device comprising a memory circuitry, a processor circuitry, and a wireless interface, wherein the wireless device is configured to perform any of the methods according to any of items 15-16.

The use of the terms "first", "second", "third" and "fourth", "primary", "secondary", "tertiary" etc. does not imply any particular order, but are included to identify individual elements.

Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1A-6 comprises some circuitries or operations which are illustrated with a solid line and some circuitries or operations which are illustrated with a dashed line. The circuitries or operations which are comprised in a solid line are circuitries or operations which are comprised in the broadest example embodiment. The circuitries or operations which are comprised in a dashed line are example embodiments which may be comprised in, or a part of, or are further circuitries or operations which may be taken in addition to the circuitries or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly to be regarded in an illustrative rather than restrictive sense. The claimed disclosure is intended to cover all alternatives, modifications, and equivalents.

APPENDIX 1

Appendix 1 illustrates one example implementation of the proposed technique for the 3GPP specification.

*Abstract of the contribution: Solution that enables a UE to receive data services from one network (e.g. NPN), and paging as well as data services from another network (e.g. PLMN) simultaneously.*

*A key issue aims at addressing the following aspects:*
*1. Study whether there are support for service continuity (assuming PSA may reside in either PLMN or in the NPN) between PLMN and NPN (SNPN or PNI-NPN) with overlapping radio coverage areas;*
*2. Study means to enable a UE to receive data services from one network (e.g. NPN), and paging as well as data services from another network (e.g. PLMN) simultaneously.*
*NOTE: It is assumed that the FS_IIoT will cover aspects to enable low latency data services, and that FS_5MBS will cover aspects to enable low latency multicast downlink services, while the scope of the FS_eNPN is to enable these services while the UE is using two networks e.g. NPN and PLMN.*

In Rel-16 support for simultaneous data service from both the NPN and PLMN is supported by a solution briefly described in Annex D.3 The connection to the other network is provided by the N3IWF in a similar fashion as for Non-3GPP Access.

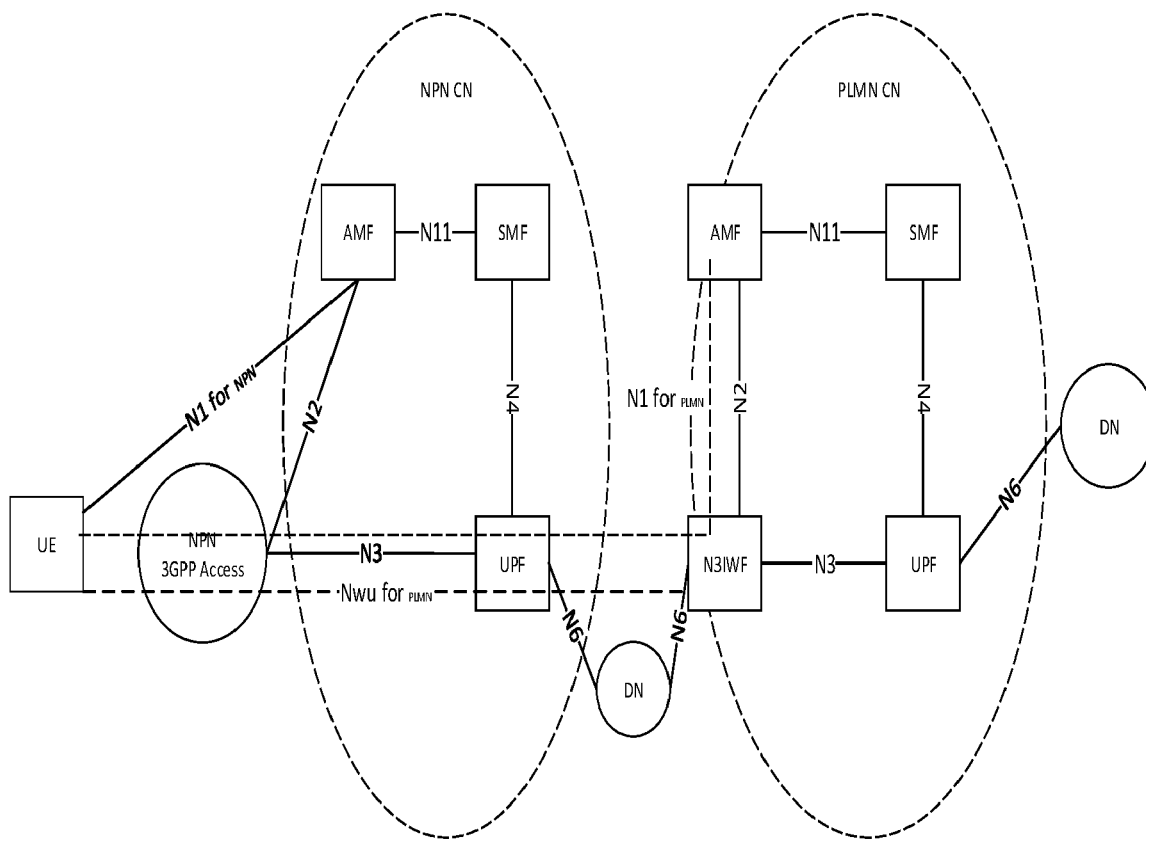

The UE and N3IWF set up a secure tunnel over the reference point Nwu. However, the rel-16 Non-3GPP Access solution does not support "paging" over the Non-3GPP access. The second objective of KI2 relates this issue since the UE using 3GPP access in the serving network can enter RRC-Idle or RRC-Inactive mode. How would the other network then trigger the UE to get paged when the UE is any of the power saving mode?

Observation 1: When the UE state in the PLMN enters CM-Idle, the Nwu is lost and TS 23.501 and TS 23.502 does not support how the AMF in the PLMN can trigger paging of the UE camping on a RAN in the NPN.

Observation 2: One way to solve this issue is to never let the UE to enter CM-Idle in the PLMN.

However, we don't want to enforce that the UE shall be in RRC-Connected. The obvious way is to let the UE enter at least RRC-Inactive. There are a couple of questions that arise:

1. What happens to the secure tunnel between the UE and N3IWF?
2. Could the UE enter RRC-Idle? Or shall the UE always be released to RRC-Inactive?

3. What happens to the IP@ and port# of the UPF in the NPN if the UE enters CM-Idle in the NPN?

IPsec tunnel between the UE and N3IWF are typically robust to support interruption on any sub-link between the end point, but sooner or later the connection will time-out. If there is no traffic, then keep-alive messages should be sent to keep the IPsec tunnel. In the industry, some default configuration use IPsec lifetime of 8hours.

Observations 3: In the industry, default lifetime configurations of the IPsec tunnel should allow a UE to enter RRC-Inactive for a significant time and still logically maintain the IPsec tunnel between the UE and N3WIF.

When the UE is in RRC-Inactive all PDU session/Tunnels/N1 etc. will be maintained. Meaning that if there is a service in the PLMN that would like to communicate with the UE, then either the DL data is sent directly to the RAN or an N1 notification will be triggered to establish a new PDU session/data flow. Once the packet reaches the anchor RAN node, the RAN node will start to page the UE. The UE will resume all radio bearers and receive the DL data/NAS message.

Observations 4: It should be feasible to let the UE enter at least RRC-Inactive mode, as long as the IPsec tunnel keep alive is honoured, i.e. the IPsec tunnel between the UE and the N3IWF does not lapse.

Could the UE even enter Idle mode in the NPN? It may be possible if the AMF in the PLMN is not informed about the UE power save mode. The UE only send a release request to the NPN or the RAN/AMF/SMF in the NPN don't inform any node in the PLMN of the state change (which is the case in rel-16).

However, when the UE is in CM-Idle there may be no guarantee that the NAT in the NPN UPF gateway would keep the port number that the UE/PDU session used. If that is changed than the IPsec tunnel between the UE and the N3IWF would not work any longer. What are the alternatives?

A. By configuring the IP@ and port# with long TTL or static configuration, or

B. Setting up an IPsec tunnel between the NPN UPF and PLMN N3IWF, and then use this tunnel to guarantee that the UE address is not changed. This is one way used to overcome NAT issues when using UDP and TCP.

Observations 5: By either using IP@ and port# with long TTL ("static") in the UPF gateway or using an IPsec tunnel between the NPN gateway and PLMN N3IWF it should be possible to allow the UE to enter CM-Idle mode in the NPN. Furthermore, the AMF in the PLMN is not informed that the N1/N2 in the NPN is released.

Options:
1. Only allow UE to be released to RRC-Inactive if the UE have a connection to a second network via a N3IWF.
2. Allow that the UE can use both RRC-Inactive or RRC-Idle, by
   a. Using static or dynamic IP@ and port # in the gate way with long TTL, or
   b. Using a IPsec tunnel between the NPN gateway and the N3IWF.
   c. Not informing the AMF in the PLMN that the UE entered Idle mode (N1/N2 in the NPN is released)

Proposal: Select either option (1) or (2) or both above to enabling service from a PLMN even if the UE enters a power save mode in the NPN.

1) Proposal

Observation 1: When the UE state in the PLMN enters CM-Idle, the Nwu is lost and TS 23.501 and TS 23.502 does not support how the AMF in the PLMN can trigger paging of the UE camping on a RAN in the NPN.

Observation 2: One way to solve this issue is to never let the UE to enter CM-Idle in the PLMN.

Observations 3: In the industry, default lifetime configurations of the IPsec tunnel should allow a UE to enter RRC-Inactive for a significant time and still logically maintain the IPsec tunnel between the UE and N3WIF.

Observations 4: It should be feasible to let the UE enter at least RRC-Inactive mode, as long as the IPsec tunnel keep alive is honoured, i.e. the IPsec tunnel between the UE and the N3IWF does not lapse.

Observations 5: By either using IP@ and port# with long TTL ("static") in the UPF gateway or using an IPsec tunnel between the NPN gateway and PLMN N3IWF it should be possible to allow the UE to enter CM-Idle mode in the NPN. Furthermore, the AMF in the PLMN is not informed that the N1/N2 in the NPN is released.

Proposal: Select either option (1) or (2) or both above to enabling service from a PLMN even if the UE enters a power save mode in the NPN.

2) 6.X   Solution #X: Always in CM Connected state in the other network.
3) 6.X.1 Introduction This solution relates the second objective in KI#2. The Purpose of the objective is to allow the UE to be either in connected state or in a power save state in the serving network and still get service from the other network. This solution proposes that the UE is always in CM connected state in the other network and that the IPsec tunnel between the UE and N3IWF over Nwu is always maintained even if the UE enters a power save mode in the serving network. It may involve that the UE send IPsec keep alive messages. This solution will allow the UE to enter a power save mode and get paged triggered by the other network service.

4) 6.X.2 Functional Description

This solution is based on the following functional principals:

- The UE connects to the other network via N3IWF e.g. the other network could be a PLMN.
- The UE is always in CM-Connected in the other network and is unaware of whether the UE enters any power save mode in the serving network e.g. the serving network could be an NPN.
- The UE can either go into RRC-Inactive or even in to RRC-Idle/CM-Idle in the serving network
- In case the UE always need to be released to RRC-Inactive then a new information element (IE) in the RRC Inactive Assistance Information needs to be added. The new IE informs the RAN node that the UE shall only be released to RRC Inactive.
    - o The UE can e.g. inform the network (AMF in the NPN) in the Service Request message or the PDU Session Establishment request that the PDU session if for communication to another network via a N3IWF
    - o The NPN network detects that the PDU session is used for a IPSec tunnel. The detection is based on e.g. the IP address used belongs to a well-known N3IWF of another network.
- In case the UE is also allowed to enter CM-Idle, it is important that the gateway does not change the external UE IP address and port number. To achieve this the serving network can either:
    - o Using static or dynamic IP address and port number configuration with long TTL in the gateway, or

- o Using an IPsec tunnel between the NPN gateway and the N3IWF in the PLMN.
- The lifetime of the IPsec Tunnel between UE and N3IWF is configured to suitable long time to allow the UE to enter power save mode.
- The DL data on existing PDU session or N1 messages sent across N3IWF to the first network will trigger either the RAN node or AMF to page the UE. Whether the RAN node or the AMF node triggers paging depends on the power save mode the UE is in.
- The UE performs all necessary periodic registrations/updates to both networks and any keepalive activities to maintain the IPsec tunnel over Nwu.

5) 6.X.3 Procedures

For the case where all UE power save modes are allowed then the procedure used are all legacy procedures once the IPsec tunnel between the UPF gateway and N3IWF is established or once the PDU session is created and the IP@ and port# is configured correctly e.g. IP address and port# with long TTL. The network may need to be informed that this configuration is needed.

For the case where only RRC-Inactive mode is used as power save mode then at least a new IE needs to be added to the RRC Inactive Assistance Information indicating to the RAN that the UE shall always be released to RRC-Inactive. This change is shown in the procedure below.

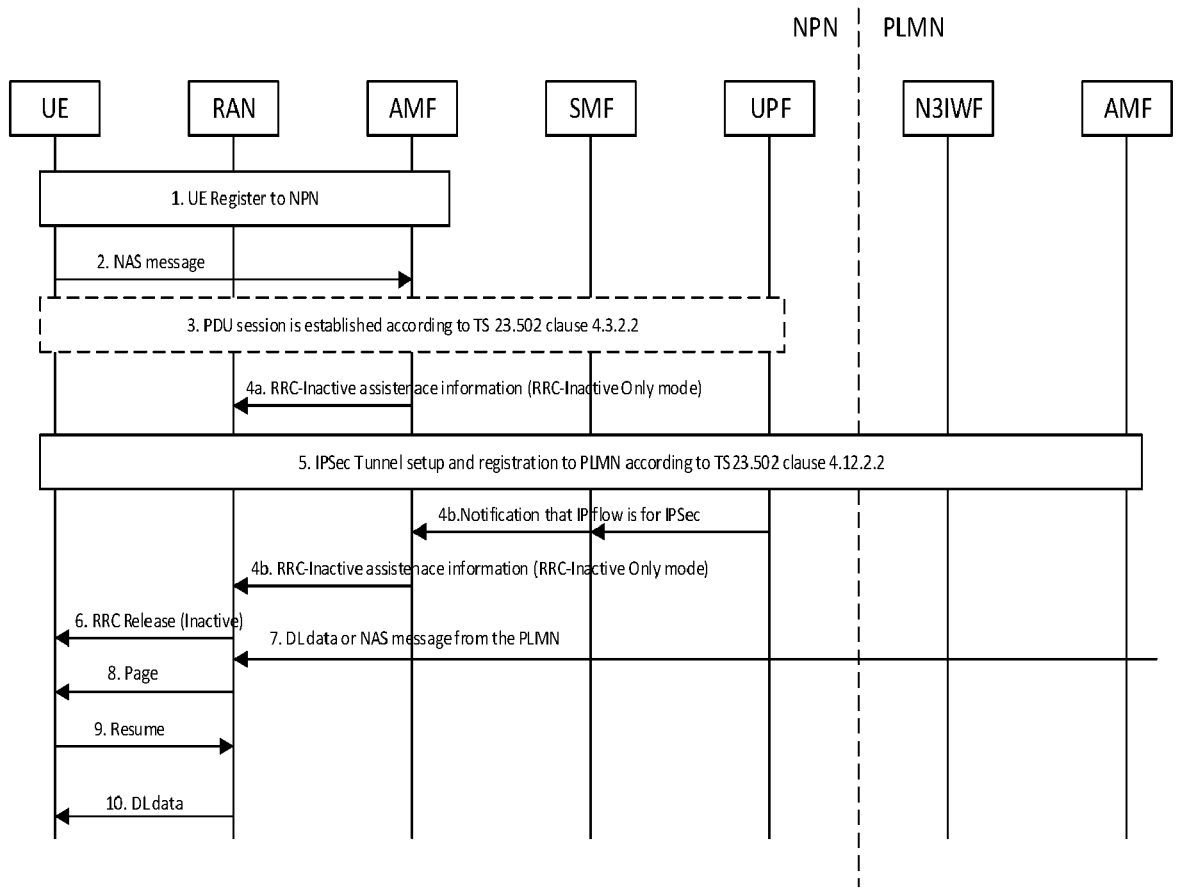

Figure 6.x.3-1: Procedure to secure that the UE is always released to RRC Inactive.

1. UE register to the NPN
2. UE request service to setup an IPsec tunnel to the N3IWF this may or may not involve setting up a new PDU session.
3. Optional: The PDU session is setup according to TS 23.502 clause 4.3.2.2.1 step 2-14
4. The AMF includes in the RRC Inactive Assistance Information that this UE shall always be released to RRC Inactive and sends the RRC Inactive Assistance Information to the RAN.
   a. Either based on the UE indication in the NAS message, or
   b. Informed by the SMF/UPF. The SMF/UPF, during step 5, detects that the target address for the IPSec tunnel is a well-known N3IWF of a PLMN.
5. UE sets up the IPSec tunnel and registers to the PLMN according to TS 23.502 clause 4.12.2.2

6. RAN releases the UE to RRC Inactive mode. The RAN always releases the UE to RRC-Inactive based on the information included in the RRC Inactive Assistance Information in step 4.
7. RAN receives DL data or NAS message from the PLMN to the UE. The figure above shows the that the first packet towards the UE will trigger the RAN node to page the UE
8. RAN pages the UE
9. UE resumes the RRC-Connection.
10. The DL data or N1 message sent to the UE

The invention claimed is:

1. A method, performed by a first core network node, for enhancing service continuity between a wireless device and a second network via a first network, wherein the first core network node is part of the first network, the method comprising:
    receiving, from the wireless device and/or from a second core network node of the first network, control signaling indicating that the wireless device requires that a tunnel, between the wireless device and the second network via a gateway of the first network, is maintained, and
    controlling a radio access network node and/or the gateway, based on the control signaling and a capability of the first core network node, to maintain the tunnel, wherein the controlling comprises transmitting, to the radio access network (RAN), control signaling indicating that the wireless device is to use one or more specific power saving modes, and
    wherein the wireless device is transitioned to the one or more specific power saving modes and the tunnel is maintained while the wireless device is in the one or more specific power saving modes.

2. The method according to claim 1, wherein controlling comprises determining, based on the control signaling, the capability of a first core network node to maintain the tunnel when the wireless device is limited to use the one or more specific power saving modes of a set of power saving modes.

3. The method according to claim 1, wherein the wireless device is in Connection Management state, CM-Connected state or CM-Idle state in the first network and CM-Connected state in the second network.

4. The method according to claim 1, wherein controlling comprises enabling the network to maintain the tunnel to the second network.

5. The method according to claim 1, wherein the control signaling indicating that the tunnel is required by the wireless device triggers, at the second core network node, a maintenance of a static IP address and/or port configuration of the gateway of the first network.

6. The method according to claim 1, wherein the control signaling indicating that the wireless device requires that the tunnel between the wireless device and the second network via the gateway of the first network is maintained is received in a session request from the wireless device to the first network.

7. The method according to claim 1, wherein the control signaling indicating that the wireless device is limited to use the one or more specific power saving modes comprises an assistance information message.

8. The method according to claim 1, wherein the specific power saving mode comprises a state where the tunnel can be maintained.

9. The method according to claim 1, wherein the specific power saving mode comprises RRC Inactive or RRC Idle, or both RRC Inactive and RRC Idle.

10. The method according to claim 1, wherein the tunnel is a secure tunnel.

11. The method according to claim 1, wherein the tunnel is a secure tunnel between the wireless device and an interworking function configured to enable interoperation between the first network and the second network.

12. The method according to claim 1, wherein determining comprises receiving from the second core network node or from the gateway, a notification that the address of an end point of the tunnel is a known address of the second network.

13. The method according to claim 1, wherein the first network is a non-public network and the second network is a public network.

14. A core network node comprising a memory circuitry, a processor circuitry, and an interface, wherein the core network node is configured to perform the method according to claim 1.

15. The method according to claim 1, wherein to maintain the tunnel while the wireless device is in the one or more specific power saving modes, the wireless device transmits a release request to a node of the first network, the release request comprising instructions not to inform any node of the second network that the wireless device has entered the one or more specific power saving modes.

16. The method according to claim 15, wherein the specific power saving mode comprises RRC Inactive or RRC Idle, or both RRC Inactive and RRC Idle.

17. The method according to claim 16, wherein the first network is a non-public network and the second network is a public network.

18. A method, performed by a wireless device, for service continuity between a first network and a second network, the second network different than the first network, the method comprising:
    entering one or more specific power saving modes;
    sending an indication to the first network which indicates a request for maintaining tunnel towards a second network while the wireless device is in the one or more specific power saving modes.

19. The method according to claim 18, wherein the indication is sent in non-access stratum NAS message.

20. A wireless device comprising a memory circuitry, a processor circuitry, and a wireless interface, wherein the wireless device is configured to perform the method according to claim 18.

* * * * *